June 24, 1952     E. R. PRICE     2,601,627
BRAKE MECHANISM
Filed Dec. 19, 1947

INVENTOR
EARL R. PRICE
BY H. O. Clayton
ATTORNEY

Patented June 24, 1952

2,601,627

UNITED STATES PATENT OFFICE 2,601,627

BRAKE MECHANISM

Earl R. Price, South Bend, Ind., assignor to Bendix Aviation Corporation, South Bend, Ind., a corporation of Delaware Application December 19, 1947, Serial No. 792,716

4 Claims. (Cl. 192—4)

This invention relates to power transmissions and refers particularly to improvements in speed ratio changing mechanisms especially adapted for use in driving motor vehicles.

More particularly, the invention relates to change speed transmissions wherein the speed ratio drive for the vehicle is changed by an improved arrangement of control mechanism.

It is an object of the invention to provide a change speed mechanism wherein speed ratio drives may be conveniently and quickly changed by the vehicle driver preferably in response to manually operable mechanisms such as the usual transmission operating gear shift lever. The mechanism is preferably so arranged that the first increment of movement of the gear shift lever results in the operation of a torque controlling power means to facilitate the operation of the change speed mechanism.

One of the most important objects of my invention is to provide a relatively simple and effective power plant adapted for use in an automotive vehicle said plant including a minimum of controls. To this end there is provided an internal combustion engine coupled to a selective gear type of change speed transmission by means of a fluid coupling; and one of the important features of the invention resides in the particular control of the coupling whereby the usual friction clutch of the power plant may be dispensed with.

A further object of my invention is to provide an improved drive system of an automotive vehicle incorporating, in said system, a fluid coupling and a change gear transmission so constructed as to provide flexibility of car control with very little effort on the part of the driver. With the mechanism of my invention all driving may be done merely by the manipulation of the gear shift lever and the accelerator of the car there being no clutch pedal to operate.

It is an object of my invention to provide a transmission system affording improved characteristics of change speed control with a comparatively simple mechanism capable of long life.

Another object of my invention is to provide a relatively simple mechanism for controlling the driving torque of the power plant of an automotive vehicle.

Yet another object of my invention is to provide an automotive power plant including but three major units positioned ahead of the propeller shaft of the plant, said units consisting of an internal combustion engine, a fluid coupling and a change gear transmission.

A further object of my invention is to provide a simple and easily serviced mechanism for controlling the fluid coupling of an automotive vehicle.

The above and other objects and features of the invention will appear more fully hereinafter from a consideration of the following description taken in connection with the accompanying drawings wherein one embodiment of the invention is illustrated by way of example.

Figure 1:
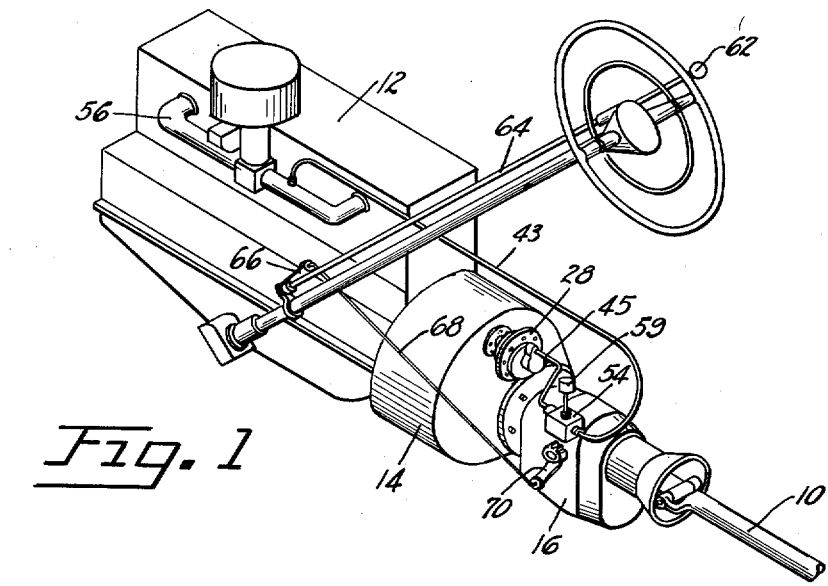
Figure 1 is a perspective view disclosing the principal elements of the mechanism constituting my invention.

Referring now to Figure 1 of the drawings disclosing a preferred embodiment of my invention, the propeller shaft 10 of the power plant of an automotive vehicle is connected to the internal combustion engine 12 of the vehicle by means including a fluid coupling 14 of the kinetic type and a change gear transmission 16. Describing the connection between the engine and the fluid coupling the engine crankshaft 18 drives the coupling impeller 20 to circulate the fluid in its vaned passages to drive a vaned runner 22 in a manner well known for fluid couplings of the type illustrated. The impeller 20 is the engine driven driving element of the coupling; and the runner 22 is the transmission driving driven element of the coupling. The runner 22 is preferably directly connected to a two-diametered end portion 24 of an intermediate drive shaft 26 said shaft being connected to the transmission 16. No claim is made to either the fluid coupling 14 or the change gear transmission 16; for the coupling may be of any well known design of the kinetic type and the transmission may be of any type including a driving shaft adapted to receive drive from the engine 12, a driven shaft adapted to drive the propeller shaft 10, and a plurality of relatively movable torque transmitting gears or their equivalent constituting a part of the force transmitting means interconnecting said driving and driven shafts.

Describing now the most important feature of my invention there is provided means, preferably power means of the pressure differential operated type, for controlling the driving torque of the engine to facilitate an operation of the transmission; and it is to be remembered that the power plant of my invention does not include the usual friction clutch. Now the standard power plant of an automotive vehicle includes a friction clutch which is disengaged prior to an operation of the transmission; for this operation takes the load off the engine driven driving gear of the meshed gears of the transmission thereby facilitating both the de-meshing of said gears and the meshing of gears to establish a new setting of the transmission.

With the power plant of my invention, that is one including a fluid coupling and a change gear transmission interconnecting the engine and propeller shaft, it is desirable to absorb some of the kinetic energy of the vaned runner 22 and parts drivably connected thereto, after the accelerator of the car has been released preliminary to operating the transmission. As described above this operation is necessary to reduce the load on the driving gear of the transmission and thereby facilitate the operation of the transmission. With the mechanism of my invention this result is effected by reducing the by the vaned runner 22.

To this end there may be provided a vacuum operated motor 28 the power element 30 of which is connected to a brake mechanism 32 operably connected to the runner 22 of the coupling 14. The brake mechanism 32, including a fixed part and a movable part, preferably includes a movable shoe member 34 which is operably connected to the power element 30 by a rod 36 said rod being slidably mounted in a bearing member 38. As is disclosed in Figure 2 the bearing member may be detachably secured to the casing 40 of the fluid coupling unit; and the outer end of the member 38 is preferably enlarged to provide one half of the casing of the motor 28. Completing the description of the brake 32 the movement of the shoe 34 is guided by a pin 42 slidable within a recess 44 in one end of the bearing member 38; and friction material 46 on the inner face of the shoe 34 is adapted to contact the face of a brake disk member 48 which is fixedly secured to the small diametered part of the member 24. As is disclosed in Figure 2 the latter member is fixedly secured, by a pin 50, to the outer end of the main body of the shaft 26. The shaft 26 with its two-diametered outer end portion 24 and connected brake disk 48 rotate as a unit being driven by the vaned runner 22.

Figures 2, 3:
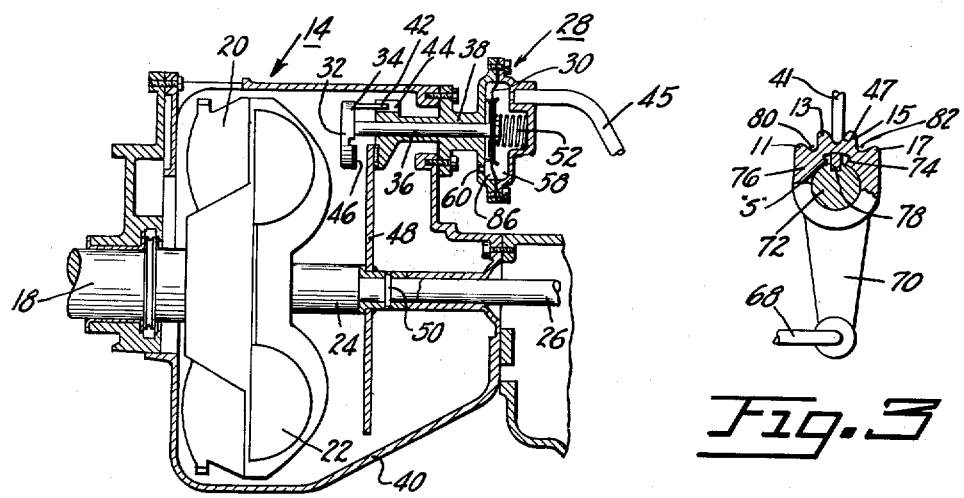
Figure 2 is a sectional view disclosing the details of the power means for controlling the fluid coupling of my invention.
Figure 3 is a view, largely in section, disclosing details of the valve operating means of the power means of my invention.

A motor spring 52 serves to bias the power element 30, to the left, Figure 2, to move the brake shoe 34 out of contact with the brake disk 48 thereby effecting a release of the brake. To apply the brake 32, that is move the shoe 34 into contact with the disk 48, it is necessary to energize the motor 28, and this operation is effected by opening a three way valve 54, Figure 1, to connect the intake manifold 56 of the engine 12 with a control compartment 58 of the motor 28. In this operation a valve stem 41, Figure 3, is moved upwardly out of a recess 47 in a hub member 76 and this operation serves to move a valve member, not shown, to interconnect a conduit 43 with a conduit 45. The conduit 43 interconnects the intake manifold 56 and the valve 54, and the conduit 45 interconnects the valve 54 with the control compartment 58 of the motor 28. A de-energization of the motor 28, resulting from a movement of the stem 41 into the recess 47, results in an expansion of the spring 52 to move the shoe 34 to the position disclosed in Figure 2. In this operation the control compartment 58 is vented to the atmosphere via an air cleaner 59, the three way valve 54, and the conduit 45. The three way valve 54 is of standard design such for example as that disclosed in U. S. Patent No. 2,152,089, dated March 28, 1939; accordingly this valve is not disclosed in detail in the instant application. The stem 41 of the valve 54 is moved downwardly by a spring, not shown, to close the valve.

Describing now the means for operating the valve 54 this means is preferably manually operated and is also preferably connected to the shift lever 62 of the car. The shift lever is operative, through the intermediary of force transmitting links 64, 66, and 68 and a crank 70, to operate the transmission 16. The connection between the crank 70 and a transmission operating shaft 72 is of the lost motion type in order that the valve 54 may be operated to energize the motor 28 before the operation of the transmission is initiated. To this end there is provided a recess 74 in the hub member 76 said member constituting a part of the crank 70. The outer periphery of the member 76 is provided with teeth 11, 13, 15 and 17 constituting part of means for operating the valve 54. The usual detent mechanism of the transmission serves to maintain the shaft 72 in any one of three positions that is a transmission neutral position, a high gear position and a low gear position; and with the mechanism of my invention the valve operating stem 41, which is spring biased downwardly, serves to position the crank 70 so that a key member 78 in the shaft 72 is positioned in the center of the recess 74. When the transmission is established in either its high gear or low gear settings the same relative position of the parts obtains, that is the valve operating stem 41 is positioned, respectively, in a recess 82 and in a recess 80 of the hub member 76. With the stem 41 so positioned the valve 54 is closed that is the same is operative to de-energize the motor 28 to release the brake 32.

Describing now the operation of the mechanism of my invention it will be assumed that the engine 12 is idling to make of the intake manifold 56 as a source of vacuum. It will also be assumed that the transmission is established in its neutral setting and when so established the valve operating parts assume the relative positions disclosed in Figure 3. The motor 28 is then de-energized and the motor and brake parts assume the relative positions disclosed in Figure 2.

To get the vehicle under way the driver will then probably establish the transmission in its low gear setting and this operation is effected by rotating the shift lever 62 counterclockwise, Figure 1. Now the first increment of movement of the shift lever results in a clockwise movement of the crank 70 to take up the slack between the hub 76 and the key 78. This slack take up or lost motion is indicated by the letter "S" in Figure 3; and this operation results in an opening of the valve 54 to energize the motor 28 to apply the brake 32. In this operation the power element 30 is subjected to a differential of pressures that is the pressure of the air within the compartment 58 of the motor and the relatively higher pressure of air within a compartment 86 of the motor the latter compartment being vented to the atmosphere by an opening 60 in the motor casing.

Now the application of the brake 32 effects a slowing down of the drive shaft 26 thereby facilitating a meshing of the gears of the transmission to establish the same in its low gear setting. When the crank 70 and connected shaft 72 are in their low gear positions the valve operating stem 41 registers within the recess 80, Figure 3, and the valve 54 is operative to de-energize the motor 28; and it is to be noted that the tooth 13 provides cam means for moving the stem 41 to its valve open position as the low gear operation of the transmission is being effected. It is not until the low gear setting of the transmission is completed or substantially completed that the stem 41 is moved by the valve spring to a position to effect the brake released position of the valve 54.

The transmission having been established in its low gear setting the driver will then speed up the engine 12 to increase the power transmitted to the propeller shaft 10 via the coupling 14 and the transmission 16 to thereby accelerate the vehicle; and when the desired speed of the vehicle is obtained the driver will then release the accelerator to idle the engine and he will also move the shift lever 62 to its high gear position. As with the above described low gear operation of the mechanism the first increment of movement of the shift lever in this operation results in an opening of the three way valve 54 to energize the motor 28 to apply the brake 32; and this operation absorbs a large portion of the kinetic energy of the drive shaft 26 thereby reducing the load exerted by the driving gear of the transmission. This operation facilitates the de-meshing of the second speed gears in the operation of establishing the transmission in its high gear setting; and of course the braking of the shaft 26 in this operation also facilitates the meshing of the transmission gears to establish the high gear setting. In this high gear operation of the mechanism after the lost motion in the mechanism in Figure 3 is taken up, that is a movement which is twice the lost motion S, further movement of the force transmitting linkage results in a counterclockwise rotation of the shaft 72, Figure 3, to establish the transmission in its high gear setting; and when this operation is completed the stem 41 is nested within the recess 82. In the high gear operation of the mechanism the motor 28 is momentarily de-energized when the valve stem 41 registers in the recess 47 however the gears of the transmission are out of mesh at the time the transmission being in its neutral setting; accordingly this release of the brake is of no consequence. In this operation the movement of the stem 41 upwardly toward the crest of the gear tooth 15 serves to immediately reopen the valve 54 to again energize the motor 28.

To neutralize the transmission from its high gear setting the driver will move the shift lever counterclockwise, Figure 1, thereby effecting the double lost motion movement of the hub 76 with respect to the shaft 72 the valve 54 being operated during this movement to effect the braking operation of the motor 28. When the transmission is in its detent held neutral position the stem 41 is positioned half way up the inner side of the gear tooth 13 however subsequent release of the shift lever 62 results in an operation of the valve spring, not shown, to reverse the direction of movement of the crank 70 to thereby return the valve operating parts to the position disclosed in Figure 3.

There is thus provided, in the fluid coupling and coupling controlling motor operated brake 32, an engine torque controlling means to facilitate the operation of the transmission, the force exerted by the driving gear of the transmission being momentarily decreased to facilitate the de-meshing and re-meshing operation of the transmission gears; and the inclusion of the fluid coupling controlling brake 32 in the mechanism of my invention makes possible an automotive power plant eliminating the usual friction clutch. With the power plant of my invention, the engine torque is controlled to facilitate an operation of the transmission said control being effected by the control of a fluid coupling of said plant; and the control of the fluid coupling is preferably effected by power means controlled by an operation of the transmission operating shift lever of the vehicle. The hub 76, recessed at 74, cooperating with the key member 78, and the spring operated pin 41 cooperating with the cam members 11, 13, 15, and 17, provide a lost motion connection insuring a brake applying operation of the motor 28 immediately prior to an operation of the transmission and a brake releasing operation of said motor as the operation of the transmission is being completed. There is thus provided, by the mechanism of my invention, a relatively simple power plant consisting of a minimum of parts controlled by the operation of a minimum of controls.

Although only one embodiment of the invention has been illustrated and described, various changes in the form and relative arrangements of the parts may be made to suit requirements.

I claim:

1. The combination, in the power plant of an automotive vehicle, of a fluid coupling including a driven element and a change gear transmission mechanism including a gear shift lever and a driving element, said driving element being connected to said driven element; of power means operative to control the speed of rotation of the driven element including a brake comprising a movable brake shoe and a fixed part connected to the latter element, a pressure differential operated motor having its power element connected to said brake shoe, valve means for controlling the operation of said motor, and force transmitting means, operated by the gear shift lever, for actuating both the valve means and the transmission, said force transmitting means including a lost motion connection between the transmission and the valve and operative, by virtue of said lost motion connection, to effect an operation of the valve means before the force transmitting means is operative to actuate the transmission.

2. Mechanism adapted to decelerate a driving member of the power plant of an automotive vehicle to facilitate the operation of a change-speed transmission of said power plant including a brake mechanism adapted to be connected to said driving member, power means for operating said brake mechanism including a pressure differential operated motor, a valve for controlling the operation of the motor, and manually operated means for operating both the valve and the transmission including force transmitting means connected with the valve and adapted to be connected to a manually operated transmission operating shift lever and force transmitting means adapted to be connected to the transmission, the connection between said two force transmitting means including a lost motion connection whereby with an operation of the first mentioned force transmitting means the valve is operated prior to an operation of the transmission.

3. Mechanism adapted to decelerate a moving part of the power plant of an automotive vehicle to facilitate the operation of a change-speed transmission of said power plant including a brake mechanism adapted to be connected to said moving part, power means for operating said brake mechanism including a pressure differential and spring operated motor, the spring of said motor serving to release the brake and the power element of the motor serving, when the motor is energized, to apply the brake; a three-way valve for controlling the operation of the motor, and manually operated means for operating both the valve and the transmission including manually operated force transmitting means, comprising cam means, connected with the valve, and force transmitting means adapted to be connected to the transmission, the connection between said two force transmitting means including a lost motion connection whereby with an operation of the first mentioned force transmitting means the valve is operated prior to an operation of the transmission.

4. The combination with a fluid coupling including driving and driven elements and a change-speed transmission mechanism including a gear shift lever and gear operating means biased to any one of three operative positions; of means for operating the transmission and for decelerating the movement of the driven element of the coupling to thereby facilitate the operation of the transmission said means comprising a motor operably connected to the driven element, a valve for controlling said motor, and manually operated means for operating both the valve and the transmission including force transmitting linkage interconnecting the gear operating means, the valve and the gear shift lever said linkage comprising force transmitting means, including a valve operating pin and a plurality of cam members cooperating with said pin, interconnecting the valve and shift lever, and further including other force transmitting means connected with the gear operating means; the pin and cam members cooperating to bias the first mentioned force transmitting means into certain positions with respect to the second mentioned force transmitting means and the parts of the mechanism being so constructed and arranged that there is provided a lost motion connection between the two force transmitting means to make possible an operation of the motor prior to an operation of the transmission mechanism.

EARL R. PRICE.

REFERENCES CITED

The following references are of record in the file of this patent:

UNITED STATES PATENTS

| Number | Name | Date |
| --- | --- | --- |
| 1,380,051 | Fletcher | May 31, 1921 |
| 2,104,608 | Cox | Jan. 4, 1938 |
| 2,247,714 | Peterson | July 1, 1941 |
| 2,280,157 | Mead | Apr. 21, 1942 |
| 2,304,375 | Peterson | Dec. 8, 1942 |
| 2,353,137 | Banker | July 11, 1944 |
| 2,358,846 | Andres | Sept. 26, 1944 |
| 2,399,567 | Peterson | Apr. 30, 1946 |
| 2,406,273 | Waite | Aug. 20, 1946 |
| 2,421,190 | Dodge | May 27, 1947 |
| 2,433,003 | Swennes | Dec. 23, 1947 |
| 2,448,678 | McFarland | Sept. 7, 1948 |
| 2,479,183 | Peterson | Aug. 16, 1949 |
| 2,493,592 | Peabody | Jan. 3, 1950 |